US009373838B2

(12) United States Patent
Yushin et al.

(10) Patent No.: US 9,373,838 B2
(45) **Date of Patent: *Jun. 21, 2016**

(54) ELECTRODES, LITHIUM-ION BATTERIES, AND METHODS OF MAKING AND USING SAME

(75) Inventors: Gleb Yushin, Atlanta, GA (US); Oleksandr Magazynskyy, Atlanta, GA (US); Patrick Dixon, Dunwoody, GA (US); Benjamin Hertzberg, New York, NY (US)

(73) Assignees: Georgia Tech Research Corporation, Atlanta, GA (US); Sila Nanotechnologies, Inc., Alameda, CA (US)

( * ) Notice: Subject to any disclaimer, the term of this patent is extended or adjusted under 35 U.S.C. 154(b) by 984 days.

This patent is subject to a terminal disclaimer.

(21) Appl. No.: 13/498,529

(22) PCT Filed: Sep. 29, 2010

(86) PCT No.: PCT/US2010/050794

§ 371 (c)(1), (2), (4) Date: Sep. 6, 2012

(87) PCT Pub. No.: WO2011/041468

PCT Pub. Date: Apr. 7, 2011

(65) Prior Publication Data

US 2012/0321959 A1 Dec. 20, 2012

Related U.S. Application Data

(60) Provisional application No. 61/246,741, filed on Sep. 29, 2009.

(51) Int. Cl.

| | |
|---|---|
| ***H01M 4/38*** | (2006.01) |
| ***H01M 4/56*** | (2006.01) |

(Continued)

(52) U.S. Cl.

CPC .............. *H01M 4/366* (2013.01); *H01M 4/133* (2013.01); *H01M 4/137* (2013.01); *H01M 4/38* (2013.01);

(Continued)

(58) Field of Classification Search

None

See application file for complete search history.

(56) References Cited

U.S. PATENT DOCUMENTS

| | | | |
|---|---|---|---|
| 6,406,817 | B2 | 6/2002 | Wariishi et al. |
| 7,592,095 | B2 | 9/2009 | Lee et al. |

(Continued)

FOREIGN PATENT DOCUMENTS

| | | |
|---|---|---|
| CA | 2709868 | 7/2009 |
| WO | 2006071076 A1 | 7/2006 |

OTHER PUBLICATIONS

Numao et al., "Synthesis and characterization of mesoporous carbon nano-dendrites with graphitic ultra-thin walls and their application to supercapacitor electrodes," Carbon, vol. 47, Available Online Oct. 17, 2008, pp. 306-312.*

(Continued)

*Primary Examiner* — Ula C Ruddock
*Assistant Examiner* — Matthew Van Oudenaren
(74) *Attorney, Agent, or Firm* — Muncy, Geissler, Olds & Lowe, P.C.

(57) ABSTRACT

Described herein are improved composite anodes and lithium-ion batteries made therefrom. Further described are methods of making and using the improved anodes and batteries. In general, the anodes include a porous composite having a plurality of agglomerated nanocomposites. At least one of the plurality of agglomerated nanocomposites is

100 formed from a dendritic particle, which is a three-dimensional, randomly-ordered assembly of nanoparticles of an electrically conducting material and a plurality of discrete non-porous nanoparticles of a non-carbon Group 4A element or mixture thereof disposed on a surface of the dendritic particle. At least one nanocomposite of the plurality of agglomerated nanocomposites has at least a portion of its dendritic particle in electrical communication with at least a portion of a dendritic particle of an adjacent nanocomposite in the plurality of agglomerated nanocomposites.

19 Claims, 6 Drawing Sheets

(51) Int. Cl.

| | |
|---|---|
| ***B05D 5/12*** | (2006.01) |
| ***B82Y 30/00*** | (2011.01) |
| ***H01M 4/36*** | (2006.01) |
| ***H01M 4/62*** | (2006.01) |
| ***H01M 4/587*** | (2010.01) |
| ***H01M 4/133*** | (2010.01) |
| ***H01M 4/137*** | (2010.01) |
| ***H01M 4/60*** | (2006.01) |
| *H01M 4/1395* | (2010.01) |
| *H01M 10/0525* | (2010.01) |
| *H01M 4/1393* | (2010.01) |

(52) U.S. Cl.

CPC .............. *H01M 4/587* (2013.01); *H01M 4/602* (2013.01); *H01M 4/625* (2013.01); *B82Y 30/00* (2013.01); *H01M 4/1393* (2013.01); *H01M 4/1395* (2013.01); *H01M 4/386* (2013.01); *H01M 4/387* (2013.01); *H01M 10/0525* (2013.01); *Y02E 60/12* (2013.01); *Y02T 10/7011* (2013.01); *Y10S 977/773* (2013.01)

(56) References Cited

U.S. PATENT DOCUMENTS

| | | | | |
|---|---|---|---|---|
| 2002/0045097 | A1 | 4/2002 | Ikeda et al. | |
| 2002/0086211 | A1 | 7/2002 | Umeno et al. | |
| 2003/0198870 | A1 | 10/2003 | Wariishi et al. | |
| 2004/0126659 | A1 | 7/2004 | Graetz et al. | |
| 2005/0013877 | A1 | 1/2005 | Jellum et al. | |
| 2006/0008706 | A1 | 1/2006 | Yamaguchi et al. | |
| 2006/0093923 | A1 * | 5/2006 | Howard et al. | 429/322 |
| 2006/0160250 | A1 | 7/2006 | Bonassar et al. | |
| 2007/0122700 | A1 | 5/2007 | Miyachi et al. | |
| 2008/0020923 | A1 | 1/2008 | Debe et al. | |
| 2008/0063931 | A1 | 3/2008 | Zucker et al. | |
| 2008/0261116 | A1 | 10/2008 | Burton et al. | |
| 2009/0130562 | A1 | 5/2009 | Mao et al. | |
| 2009/0185941 | A1 | 7/2009 | Breznova et al. | |

OTHER PUBLICATIONS

European Supplementary Search Report issued on Jan. 27, 2014 in European Application No. 10821208.5.

Li-Feng Cui et al: "Carbon-Silicon Core-Shell Nanowires as High Capacity Electrode for Lithium Ion Batteries"; vol. 9; No. 9; pp. 3370-3374 (2009).

Liu et al: "Preparation on Sn films deposited on carbon nanotubes"; ScienceDirect; Applied Surface Science; vol. 253; No. 20; pp. 8356-8359 (2007).

Chinese Office Action issued on Apr. 2, 2014 in Chinese Application No. 201080043546.5.

Guo et al. "Silicon/Disordered Carbon Nanocomposites for Lithium-Ion Battery Anodes" Journal of The Electrochemical Society, 152 (11) A2211-A2216, 2005.

Search Report for PCT Application No. PCT/US2010/050794 issued on Dec. 17, 2010.

Written Opinion for PCT Application No. PCT/US2010/050794 issued on Dec. 17, 2010.

International Preliminary Examination Report for PCT Application No. PCT/US2010/050794 issued on Apr. 30, 2012.

Search Report for PCT Application No. PCT/US2010/056876 issued on Mar. 9, 2011.

Written Opinion for PCT Application No. PCT/US2010/056876 issued on Mar. 9, 2011.

International Preliminary Examination Report for PCT Application No. PCT/US2010/050794 issued on May 22, 2012.

Search Report for PCT Application No. PCT/US2011/035072 issued on Aug. 26, 2011.

Written Opinion for PCT Application No. PCT/US2011/035072 issued on Aug. 26, 2011.

International Preliminary Examination Report for PCT Application No. PCT/US2011/035072 issued on Nov. 6, 2012.

* cited by examiner

ELECTRODES, LITHIUM-ION BATTERIES, AND METHODS OF MAKING AND USING SAME

CROSS-REFERENCE TO RELATED APPLICATION

This application claims the benefit of U.S. Provisional Patent Application No. 61/246,741, filed 29 Sep. 2009, and incorporated herein by reference in its entirety as if fully set forth below.

STATEMENT REGARDING FEDERALLY SPONSORED RESEARCH

This invention was made with United States Government support under SBIR grant number NNX09CD29P 2008-1 awarded by the National Aeronautics and Space Administration. The United States Government has certain rights in this invention.

TECHNICAL FIELD

The various embodiments of the present invention relate generally to energy storage devices, and more particularly, to lithium-ion batteries, and to methods of making and using such devices.

BACKGROUND

Owing in part to their relatively high energy densities, light weight, and potential for long lifetimes, lithium-ion (Li-ion) batteries are used extensively in consumer electronics. In fact, Li-ion batteries have essentially replaced nickel-cadmium and nickel-metal-hydride batteries in many applications. Despite their increasing commercial prevalence, further development of Li-ion batteries is needed, particularly for potential applications in low- or zero-emission hybrid-electrical or fully-electrical vehicles, energy-efficient cargo ships and locomotives, aerospace, and power grids. Such high-power applications will require electrodes with higher specific capacities than those used in currently-existing Li-ion batteries.

Currently, carbon-based materials (e.g., graphite) are employed as the predominant anode material in Li-ion batteries. Carbon (C), in the form of graphite, has a maximum or theoretical specific capacity of about 372 milli-Ampere hours per gram (mAh/g), but suffers from significant capacity losses during cycling. Notably, during the first charge cycle, graphite experiences a high level of irreversibility, meaning that a significant amount of lithium ions intercalate into the graphite anode, but do not deintercalate out of the anode upon discharge of the battery.

Silicon-based materials have received great attention as anode candidates because they exhibit specific capacities that are an order of magnitude greater than that of conventional graphite. For example, silicon (Si) has the highest theoretical specific capacity of all the metals, topping out at about 4200 mAh/g. Unfortunately, silicon suffers from its own significant setbacks.

The primary shortcoming of Si-based anode materials is the volume expansion and contraction that occurs as a result of lithium ion intercalation and deintercalation, respectively, during charge cycling of the battery. In some cases, a silicon-based anode can exhibit an increase, and subsequent decrease, in volume of up to about 400%. These high levels of strain experienced by the anode material can cause irreversible mechanical damage to the anode. Ultimately, this can lead to a loss of contact between the anode and an underlying current collector. Another shortcoming associated with Si-based anode materials is their low electrical conductivity relative to carbon-based anode materials.

The use of silicon-carbon composites to circumvent the limitations of pure Si-based materials has been investigated. Such composites, which have been prepared by pyrolysis, mechanical mixing and milling, or some combination thereof, generally include Si particles embedded in or on a dense carbon matrix. The large volume changes in the Si particles upon lithium intercalation, however, can be accommodated by carbon only to a limited degree, thus offering only limited stability and capacity enhancements relative to pure Si-based anodes.

Thus, despite the advancements made in anode materials, Li-ion batteries remain somewhat limited in their applications. Accordingly, there remains a need for improved anodes for use in Li-ion batteries. These improved anodes, and, ultimately, the improved Li-ion batteries, could open up new applications, such as the so-called high-power applications contemplated above. It is to the provision of such devices that the various embodiments of the present inventions are directed.

BRIEF SUMMARY

The various embodiments of the present invention provide improved Li-ion battery components, improved Li-ion batteries made therefrom, and methods of making and using such components and devices.

According to some embodiments of the present invention, an anode includes a porous composite comprising a plurality of agglomerated nanocomposites. At least one, and as many as all, of the plurality of nanocomposites includes a dendritic particle formed from a three-dimensional, randomly-ordered assembly of nanoparticles of an electrically conducting material and a plurality of discrete non-porous nanoparticles of a non-carbon Group 4A element or mixture thereof (i.e., silicon, germanium, tin, lead, and an alloy or solid solution thereof) disposed on a surface of the dendritic particle. At least one nanocomposite of the plurality of agglomerated nanocomposites has at least a portion of its dendritic particle in electrical communication with at least a portion of a dendritic particle of an adjacent nanocomposite in the plurality of agglomerated nanocomposites.

In some cases, the electrically conducting material of the dendritic particle can be amorphous or graphitic carbon. For example, the amorphous carbon can be carbon black. The non-carbon Group 4A element or mixture thereof is silicon.

In certain situations, the porous composite also includes an electrically conducting coating disposed on at least a portion of a surface of a dendritic particle of at least one of the plurality of agglomerated nanocomposites. The electrically conducting coating can be formed from carbon, too.

It is possible for the plurality of agglomerated nanocomposites to be agglomerated together using an electrically conducting additive. Similarly, the electrically conducting additive can be carbon.

It is possible, in some embodiments, for at least a portion of the discrete non-porous nanoparticles on the surface of the dendritic particle to contact each other.

In certain embodiments, the plurality of discrete non-porous nanoparticles have an average longest dimension of about 5 nanometers to about 200 nanometers.

The plurality of discrete non-porous nanoparticles can comprise about 15 weight percent to about 90 weight percent of each nanocomposite.

The porous composite can be a spherical or substantially-spherical granule as desired.

A total pore volume within the porous composite can be at least about three times a volume occupied by all of the nanoparticles in the porous composite. At the other end, the total pore volume within the porous composite can be less than about 20 times the volume occupied by all of the nanoparticles in the porous composite.

According to other embodiments of the present invention, an anode can include a matrix of a plurality of spherical or substantially-spherical porous composite granules. At least one granule, and as many as all of the granules, in the plurality of granules comprises a plurality of agglomerated nanocomposites. At least one nanocomposite of the plurality of agglomerated nanocomposites includes a dendritic particle formed from a three-dimensional, randomly-ordered assembly of annealed carbon black nanoparticles and a plurality of discrete non-porous silicon nanoparticles disposed on a surface of the dendritic particle. At least one nanocomposite, and as many as all of the nanocomposites, has at least a portion of its dendritic particle in electrical communication with at least a portion of a dendritic particle of an adjacent nanocomposite in the plurality of agglomerated nanocomposites.

A lithium ion battery can include any of the anodes described herein.

According to some embodiments of the present invention, a method of making an anode can include forming a three-dimensional, randomly-ordered dendritic particle from a plurality of discrete nanoparticles of an electrically conducting material. The method can also include disposing a plurality of discrete non-porous nanoparticles of a non-carbon Group 4A element or mixture thereof on a surface of the dendritic particle to form a nanocomposite particle. The method can further include assembling a plurality of nanocomposite particles to form a bulk unitary body or a spherical or substantially-spherical granule. Each nanocomposite particle of the plurality of nanocomposite particles can have at least a portion of the dendritic particle in electrical communication with at least a portion of a dendritic particle of an adjacent nanocomposite particle in the plurality of agglomerated nanocomposite particles.

In some cases, the method further includes assembling a plurality of granules to form an anode matrix, wherein at least a portion of at least one nanocomposite particle of each granule has a dendritic particle in electrical communication with a dendritic particle of at least a portion of at least one nanocomposite particle of an adjacent granule.

When the non-carbon Group 4A element or mixture thereof is silicon, disposing the plurality of discrete non-porous silicon nanoparticles can involve chemical vapor deposition of a decomposition product of a silane or chlorosilane.

Assembling the plurality of nanocomposite particles to form the bulk unitary body or the spherical or substantially-spherical granule can involve granulation of the plurality of nanocomposite particles. The granulation step can include wet granulation using a polymeric binder that is ultimately converted into carbon.

In some cases, the method further includes applying an electrically conducting coating to at least a portion of the assembled plurality of nanocomposite particles.

In some cases, the method also includes adding an electrically conducting additive to enhance the electrical communication.

Other aspects and features of embodiments of the present invention will become apparent to those of ordinary skill in the art, upon reviewing the following detailed description in conjunction with the accompanying figures.

BRIEF DESCRIPTION OF THE DRAWINGS

FIG. 1(*b*) is a schematic illustration of an exemplary granule for making an anode in accordance with some embodiments of the present invention.

FIG. 3(*d*) provides an EDX spectrum of a Si-C composite granule showing the C and Si Kα lines, O and Cu sample holder lines.

FIG. 3(*e*) provides XRD spectra of Si-coated carbon black both before and after carbon deposition at about 700° C. for about 30 minutes.

FIG. 3(*f*) provides a TEM image of a Si nanoparticle crystallized after exposure to about 700° C.

FIG. 4(*e*) provides the cumulative size distribution of spherical granules synthesized at about 700° C.

FIG. 4(*f*) illustrates $N_2$ sorption isotherms on the surface Si-decorated annealed carbon black both before and after carbon chemical vapor deposition.

FIG. 4(*g*) provides Barrett-Joyner-Halenda cumulative specific surface area of Si-decorated annealed carbon black both before and after carbon chemical vapor deposition.

FIG. 4(*h*) provides high-magnification SEM images of the surface of spherical granules produced during carbon-coating of pure carbon black, shown for comparison to FIG. 4(*d*).

FIG. 5(*b*) illustrates the galvanostatic charge-discharge profiles of the granule electrodes at rates of about C/20, 1C and 8C in comparison to that of annealed carbon black- and commercial graphite-based electrodes between 0 and 1.1 V.

FIG. 5(*c*) illustrates differential capacity curves of the granule electrodes in the potential window of 0 to 1.1 V collected at the rate of 0.025 mV/s.

FIG. 5(*d*) provides a SEM image of a granule after electrochemical cycling.

DETAILED DESCRIPTION

Figure 1A:
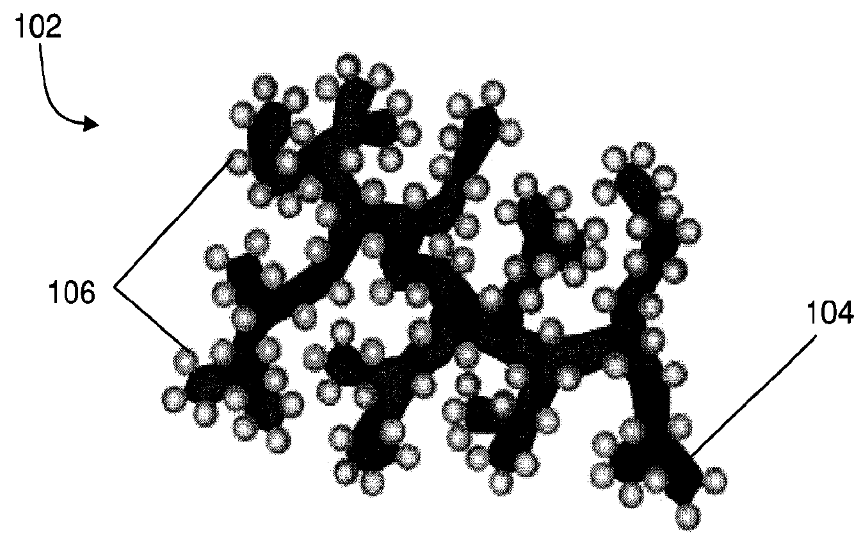
FIG. 1(*a*) is a schematic illustration of an exemplary nanocomposite building block for making an anode in accordance with some embodiments of the present invention.

Referring now to the figures, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another. Further, the terms "a," "an," and "the" do not denote a limitation of quantity, but rather denote the presence of "at least one" of the referenced item.

As stated above, the various embodiments of the present invention are directed to improved anodes for use in Li-ion batteries, and Li-ion batteries made therefrom. Methods of making and using the improved anodes and batteries are also disclosed herein.

The improved anodes generally comprise composites of a non-carbon Group 4A element or mixture thereof (e.g., silicon) and an electrically conducting material (e.g., carbon). In contrast to the prior art, however, the improved composite anodes described herein are highly porous and can accommodate the significant volume changes typically caused by lithium intercalation into the non-carbon Group 4A element or mixture thereof. As will be described in more detail below, pre-existing pores in the composite anodes provide sufficient volume for expansion and allow for fast transport of lithium ions, while the presence of an electrically conducting material allows for an improved solid/electrolyte interface formation, structural integrity, and high electrical conductivity. As a result, the porous composite anodes can conserve their size and shape upon cycling, which is important for industrial applications because commercial battery cells provide very little, if any, volume for anode expansion.

Figure 1B:
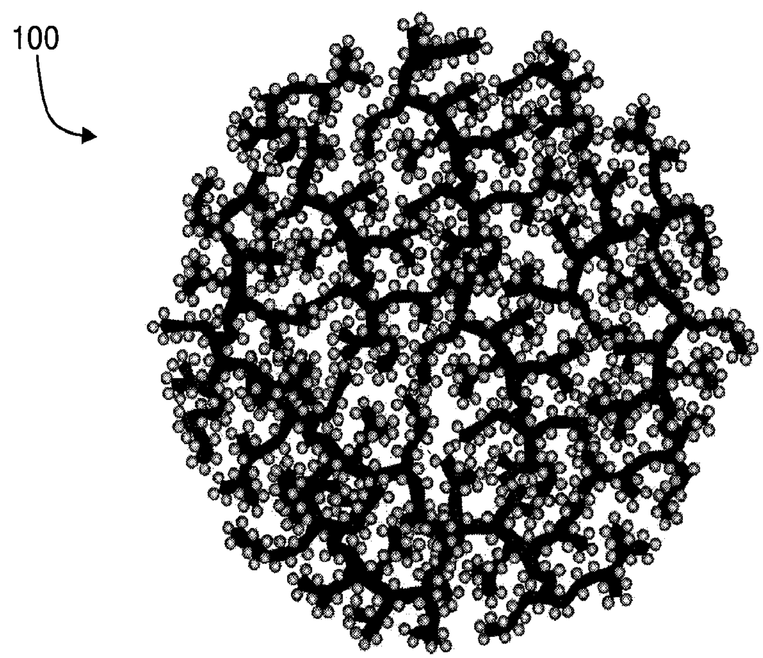

Structurally, the so-called "building blocks" of the anodes described herein are individual nanocomposites, such as the one shown in FIG. 1(*a*), which are formed from electrically conducting dendritic particles that have a plurality of discrete, non-porous nanoparticles of a non-carbon Group 4A element or mixture thereof disposed thereon.

As seen in FIG. 1(*a*), the nanocomposite 102 comprises a dendritic particle 104, which itself is a three-dimensional, randomly-ordered assembly or agglomerate of nanoparticles (not individually shown) of an electrically conducting material. The individual nanoparticles that form the dendritic particle 104 generally have an average longest dimension of about 5 nm to about 100 nm. As a result, the dendritic particle 104 generally has a longest dimension of about 100 nanometers (nm) to about 5 micrometers (μm).

In exemplary embodiments, the electrically conducting material used to form the dendritic particle 104 is elemental carbon in one of its amorphous (e.g., coal, soot, carbon black, or the like) or graphitic allotropes. While buckminsterfullerenes and carbon nanotubes are sufficiently conducting, the extent to which these allotropes can experience volume changes renders them unsuitable for use in the anodes of the present invention. In addition to elemental carbon, other electrically conducting materials that are stable under the conditions to which they will be exposed (i.e., they do not react with or substantially solubilize silicon during fabrication or use of the anode) can be implemented. Such materials will be readily apparent to those skilled in the art to which this disclosure pertains. By way of illustration, nickel is one such material.

Returning to the nanocomposites 102 in FIG. 1(*a*), disposed on the dendritic particle 104 is a plurality of discrete and non-porous nanoparticles 106 of silicon, tin (Sn), germanium (Ge), lead (Pb), or an alloy or solid solution of Si, Sn, Ge, and/or Pb. Reference will now be made to embodiments involving silicon as the non-carbon Group 4A element for illustrative convenience only.

Generally, the plurality of the discrete, non-porous silicon nanoparticles 106 can have an average longest dimension of about 5 nm to about 200 nm. Since the native oxide that forms on the surface of silicon nanoparticles is about 0.5 nm to about 1 nm thick, particles with an average longest dimension of about 1 nm to about 3 nm are too small to be used in the anodes of the present invention.

The plurality of silicon nanoparticles 106 can comprise about 15 weight percent (wt. %) to about 90 wt. % of the nanocomposite 102, based on the total weight of the nanocomposite 102. In general, a lower silicon content results in better long-term stability of the anode, particularly when carbon is used as the electrically conducting material of the dendritic particle 104, because carbon can undergo a large number of charge/discharge cycles without failing. In contrast, when the silicon content is higher, the resulting anode will exhibit better gravimetric capacity. Thus, in applications where long-term stability of the Li-ion battery is more desired than a higher gravimetric capacity, those skilled in the art to which this disclosure pertains would appreciate that lower silicon contents will be used. Similarly, in applications where the capacity of the Li-ion battery is more important than the long-term stability, higher silicon contents will be used to form the nanocomposite 102.

The anodes of the present invention generally comprise a plurality of the nanocomposite building blocks 102 agglomerated or assembled together. As shown at the end of the process flow diagram in FIG. 2, these agglomerates or assemblies can be in the form of a bulk unitary body 100 that adopts the ultimate shape of the anode. Alternatively, these agglomerates can be in the form of a particle or granule (e.g., the substantially spherical granule shown in FIG. 1(*b*) and designated by reference numeral 100), which can then be packed together in close proximity with other such particles or granules to form a matrix.

Each individual nanocomposite 102 within the agglomerate 100 is assembled in such a manner as to be in electrical communication with at least one other nanocomposite building block 102. This is generally accomplished by having at least a portion of a surface of the dendritic particle 104 of one nanocomposite 102 in contact with at least a portion of a surface of a dendritic particle 104 of another nanocomposite 102. In this manner, the conductivity of the anode is not unnecessarily decreased by the surface resistance at nanocomposite-nanocomposite boundaries. Similarly, when the anode comprises a plurality of agglomerated particles or granules 100, as shown in FIG. 1(*b*), the particles or granules 100 are packed or arranged into a matrix in such a manner as to have each particle 100 be in electrical communication with at least one other particle 100.

It should be noted that, in embodiments where the silicon content of the nanocomposites 102 is high, it may be more difficult to ensure that dendritic particles 100 of different nanocomposites 102 are in sufficiently-high contact with one another. In such cases, the electrical communication between individual nanocomposites 102 can be improved by implementing an optional layer or coating of an electrically conducting material (not shown) on at least a portion of the nanocomposites 102. This optional coating can be disposed directly on the nanocomposites 102 before, during, or after the individual nanocomposites 102 are brought into sufficient proximity to one another to form the assembly or agglomerate 100. The electrically conducting material of the optional coating can be the same or a different material as the electrically conducting material of the dendritic particle 104. This optional coating can even be disposed directly on the silicon nanoparticles, but must be formed of a material, and have a thickness, that will enable lithium ions to diffuse therethrough. The optional electrically conducting coating can also serve to impede the decomposition of the electrolyte, which results in the formation of the solid-electrolyte interface (SEI) layer.

Alternatively, instead of an electrically conducting coating or layer, an electrically conducting additive can be used to ensure that dendritic particles 100 of different nanocomposites 102 are in sufficiently-high contact with one another. One example of such an additive is an organic binder that converts primarily to carbon during fabrication and prior to implementation of the anode. Exemplary binders include polymeric materials having at least about 20 atomic percent carbon in the monomeric unit used to form the polymer. Suitable polymers include polyethers, polyesters, polymers based on methyl methacrylate, polymers based on acrylonitrile, polymers based on vinylidene fluoride, and the like. Other additives for such purposes are known to those skilled in the art to which this disclosure pertains.

As can be seen from the agglomerated nanocomposites 100 in FIGS. 1(*b*) and 2, regardless of how the nanocomposites 102 are assembled, the anode will have a high level of porosity. The exact porosity of the anode, however, will depend on the silicon content of the individual nanocomposites 102. Generally, the available pore volume for silicon expansion and contraction during charge cycling will be at least about three times the volume of the silicon nanoparticles. This threshold pore space will minimize or completely prevent the anode from experiencing any strain as a result of the silicon expansion. In order to minimize any adverse effects on the volumetric performance of the anode, the pore volume should be limited to less than or equal to about 20 times the overall volume of the silicon nanoparticles. That is, when the pore volume is greater than about 20 times the volume of the silicon nanoparticles, the volumetric capacitance of the anode begins to suffer.

Figure 2:
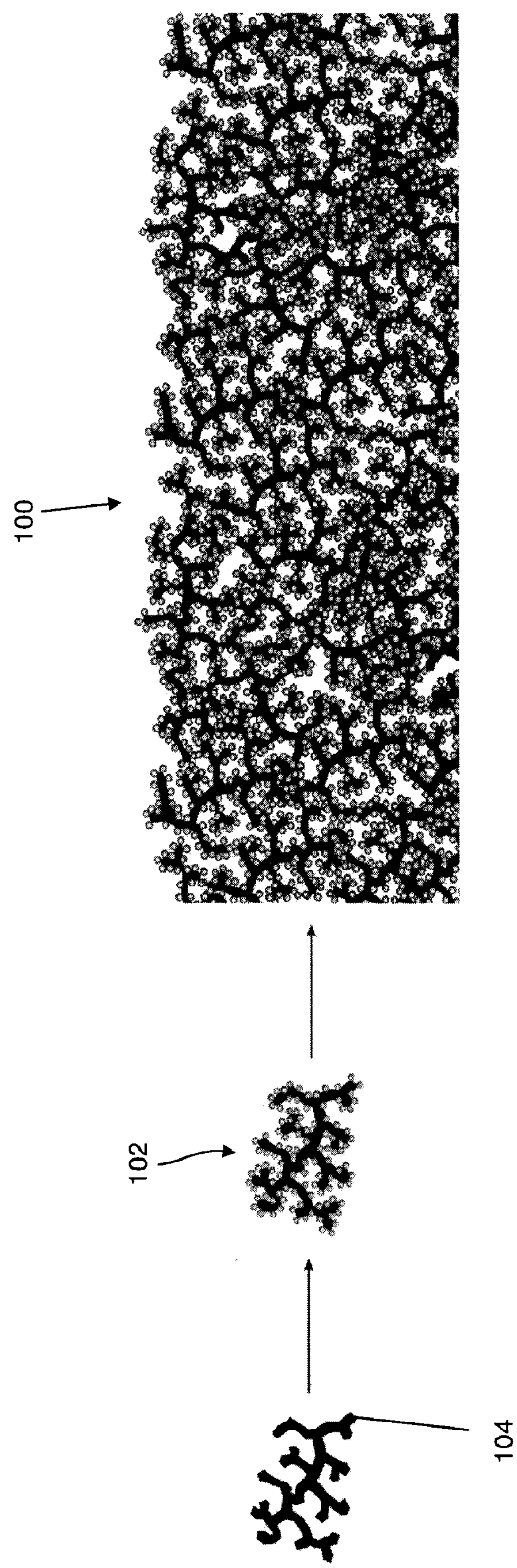
FIG. 2 is a schematic illustration of an exemplary process for making an anode in accordance with some embodiments of the present invention.

The anodes described above can be made using a variety of techniques. FIG. 2 provides a representative illustration of the general processes for making an anode. As seen in the first step of the process flow diagram of FIG. 2, these processes include forming a three-dimensional, randomly-ordered dendritic particle 104 from a plurality of discrete nanoparticles of an electrically conducting material. Next, a plurality of discrete non-porous silicon nanoparticles 106 are disposed on the dendritic particle to form a nanocomposite particle 102. Finally, a plurality of nanocomposite particles 102 are assembled together to form a bulk material 100 or a granule (shown in FIG. 1(*b*)) 100. In the latter case, a plurality of the granules 100 can then be consolidated into a matrix that will serve as the anode.

The plurality of discrete nanoparticles of the electrically conducting material can be assembled into the dendritic particle 104 in a number of ways. These include using a purely thermal treatment (e.g., sintering or annealing the particles together), sonication, chemically reacting the nanoparticles with one another, spontaneously (e.g., via a reduction in the surface energy of adjacent nanoparticles), and/or the like. Care must be taken to ensure that the agglomerated nanoparticles have a random arrangement to maximize surface area and minimize density when the nanocomposites 102 are assembled into the bulk material or granule 100. Otherwise, an ordered arrangement of nanoparticles will result in close-packing of the nanocomposites 102 when they are assembled into the bulk material or granule 100, thereby reducing porosity (and, ultimately, surface area) and also increasing the density of the agglomerated nanocomposites in the bulk material or granule 100.

Once the dendritic particle 104 is formed, the silicon nanoparticles 106 can be disposed thereon. In some embodiments, the silicon nanoparticles 106 can be grown directly on the surface of the dendritic particle 104. Many deposition techniques can be used to do this, including, without limitation, physical vapor deposition and all of the variants thereof, chemical vapor deposition and all of the variants thereof, sputtering and all of the variants thereof, ablation deposition and all of the variants thereof, molecular beam epitaxy and all of the variants thereof, electrospray ionization and all of the variants thereof, and the like. In other embodiments, the silicon nanoparticles 106 can be prepared independently, and then coupled to the surface of the dendritic particle 104 using physical or chemical means. Such techniques are known to those skilled in the art to which this disclosure pertains.

It is important that the silicon nanoparticles 106 be discrete particles so as to not form a continuous or substantially-continuous film on the surface of the dendritic particle 104. By remaining as discrete particles, the silicon can expand and contract during charge cycling with minimal or no strain to the anode. In contrast, if the silicon were disposed on the dendritic particle 104 as a continuous film or layer, there would be less pore space in the overall anode. This could result in slower or less lithium ion movement into and out from the anode during charge cycling. It can also result in greater strain on the anode because significantly more of the anode could undergo expansion and contraction during charge cycling.

Similarly, the silicon nanoparticles 106 should be fully dense (i.e., less than or equal to about 5 percent of the surface of the nanoparticle comprises pore walls, based on the total surface area of the nanoparticle), rather than porous. Porosity in the silicon itself can result in lithium ions being trapped within the pore walls, thereby causing capacity losses for the anode.

Once the silicon nanoparticles 106 are disposed on the dendritic particles 104 to form the nanocomposite building blocks 102, the overall anode structure can be formed. That is, a plurality of the nanocomposite building blocks 102 can be assembled together to form the anode. In some cases, the nanocomposite building blocks 102 can be assembled to form a larger particle or granule 100. Next, a plurality of granules can be consolidated into a matrix, which will serve as the anode. Alternatively, the nanocomposite building blocks 102 can be assembled to form a bulk structure 100, which will serve as the anode.

The nanocomposite building blocks 102 can be aggregated using a variety of techniques. These include the use of self assembly chemistry, pressure, heat, granulation, a binder, combinations thereof, or the like. Such techniques are known to those skilled in the art to which this disclosure pertains.

If the optional electrically conducting coating is used, it can be implemented after the nanocomposite building blocks 102 are produced, either before or during the step where the nanocomposite building blocks 102 are aggregated. Alternatively, after the nanocomposite building blocks 102 are aggregated, the optional electrically conducting coating can be applied to the aggregated nanocomposite building blocks 102. This coating can be applied to the nanocomposite building blocks 102 using any of the techniques described above for growing the silicon nanoparticles 106.

If, however, the optional electrically conducting additive is used, it can be incorporated during or after the step where the nanocomposite building blocks 102 are aggregated. Such an additive can be incorporated using known techniques for introducing additives.

If the nanocomposite building blocks 102 are aggregated into granules or particles 100, a plurality of granules or particles 100 can be placed in close contact with one another to form a matrix, which can serve as the anode.

Once the anode is formed, it can be implemented in the fabrication of a Li-ion battery. Such a battery would include an anode as described herein, a cathode, and an electrolyte separator, which is interposed between the anode and the cathode. Any type of Li-ion battery can be formed using the anodes described herein, as would be understood by those skilled in the art to which this disclosure pertains.

During operation of the Li-ion battery, the battery cell can be charged and discharged as would be understood by those skilled in the art to which this disclosure pertains. By way of illustration, when the battery is in use (i.e., discharging), lithium ions deintercalate from the silicon nanoparticles 106 of the anode (causing the silicon nanoparticles 106 to contract), migrate through the ion-conducting electrolyte, and intercalate into the cathode. The motion of each lithium ion in the internal circuit of the Li-ion battery is compensated for by the motion of an electron in the external circuit, thus generating an electric current. The energy density by weight released by these reactions is both proportional to the potential difference between the two electrodes and to the amount of lithium that will be intercalated into the cathode.

In contrast, when the battery is being charged or re-charged, the opposite process occurs. That is, when an electron moves in the opposite direction in the external circuit (from the power source charging the battery) lithium ions deintercalate from the cathode, migrate through the ion-conducting electrolyte, and intercalate into the silicon nanoparticles 106 of the anode, causing the silicon nanoparticles 106 to swell or expand.

Again, owing to the structure of the anodes described herein, it is possible for the charge-cycling process to be repeated numerous times with minimal or no strain on the anode.

An exemplary anode structure and process for making the anode structure will now be described. In this particular embodiment, the dendritic particle 104 is formed from carbon black nanoparticles that have been annealed together. Annealing the carbon black nanoparticles serves to increase the purity of the carbon, which in turn serves to increase the cycle life of the anode. Carbon black nanoparticles are used in this embodiment owing to their relatively low cost and level of initial purity relative to other allotropes of carbon.

Once the dendritic particle 104 comprising the annealed carbon black nanoparticles has been formed, silicon nanoparticles 106 are grown on the surface using chemical vapor deposition (CVD). Specifically, a silane or a chlorosilane precursor composition is decomposed so as to deposit silicon on the surface of the carbon black dendritic particle 104. Any defects on the surface of the carbon black dendritic particle 104 serve as nucleation sites for the silicon nanoparticle growth. Care must be taken to minimize the presence of oxygen during growth so as to avoid the formation of large amounts of native oxide on the surface of the silicon nanoparticles 106. Once the silicon nanoparticle CVD step is complete, the Si—C nanocomposite building block 102 is formed.

Next, a plurality of the Si—C nanocomposites 102 can be compacted together in the shape of a granule 100. The shape of the granule 100 can be maintained by exposing the plurality of compacted Si—C nanocomposites 102 to a carbon CVD step where a layer of carbon is grown on at least a portion of the various surfaces of the granule 100 by decomposition of a hydrocarbon precursor. The compacting of the plurality of Si—C nanocomposites 102 can occur via a granulation technique.

In some cases, the shape of the granule 100 can be maintained by mixing the plurality of compacted Si—C nanocomposites 102 with a sacrificial binder. The granule 100 can be exposed to a heat treatment in an oxygen-free environment to transform the sacrificial binder into carbon.

Next, a plurality of granules 100 can be assembled together to form a matrix having the desired shape of the anode. The shape of the matrix can be maintained using any of the techniques described for forming the granule 100 from the plurality of the Si—C nanocomposites 102.

In other situations, instead of a granule 100, the plurality of the Si—C nanocomposites 102 can be compacted together into the final desired shape of the anode. Again, the shape of such a bulk compacted anode body 100 can be maintained using any of the techniques described for forming the granule 100 from the plurality of the Si—C nanocomposites 102.

The various embodiments of the present invention are further illustrated by the following non-limiting examples.

EXAMPLES

Example 1

Fabrication and Characterization of Si—C Composite Anode Material

In this example, a hierarchical "bottom-up" approach was used to form Si—C porous composite granules with high capacity, stable performance, and particle size comparable to that of milled graphite (i.e., about 15 to about 30 micrometers). This powder size is commonly used in the production of Li-ion battery electrodes and does not possess the same inhalation hazard as nanoparticles. This "bottom-up" approach allowed for the fabrication of high capacity stable composite anodes with rapid charging capability.

Briefly, a chemical vapor deposition (CVD) synthesis process has been designed for depositing Si nanoparticles on the surface of carbon black (CB) nanoparticles, wherein the CB nanoparticles form short dendritic chains during high temperature pre-annealing. The about 500 nm to about 1 μm multi-branched nanocomposite was then self-assembled into large porous spherical granules during the atmospheric pressure CVD deposition of C (as schematically shown in FIG. 2). The Si CVD deposition time as well as the pressure and temperature in the deposition system determined the size of the deposited Si nanoparticles. The size of the branches in the dendritic particle and the size of the deposited Si nanoparticles determined the pore size in the granule. The diameter of the composite granules was influenced by the carbon CVD process parameters and by the size of the initial branched carbon dendritic particles. Therefore, the developed process allowed control over the particle size, pore size, and composition of the composite granule.

Annealed and chained CB particles were selected as substrates for Si spheres assembly due to their open structure, very low apparent density, and high specific surface area (about 80 $m^2/g$), providing multiple accessible sites for Si deposition. The ultra low cost of carbon black (about 10 to about 20% of the cost of purified natural graphite) and large production volume (about 9 times higher than that of natural graphite) help maintain the low cost of the synthesized composite granules. Impurities in carbon electrodes are detrimental to battery operation, contributing to parasitic side reactions, gassing in the cells, self-discharge and degradation of the shelf life of the cells. The annealing of CB at temperatures above about 2000° C. resulted in graphitization, linkage of neighboring particles, and most importantly, a very high degree of purification (greater than about 99.9%), promoting consistent properties, which are desired for Li-ion battery systems and are unattainable via chemical purification with acids.

Figure 3:
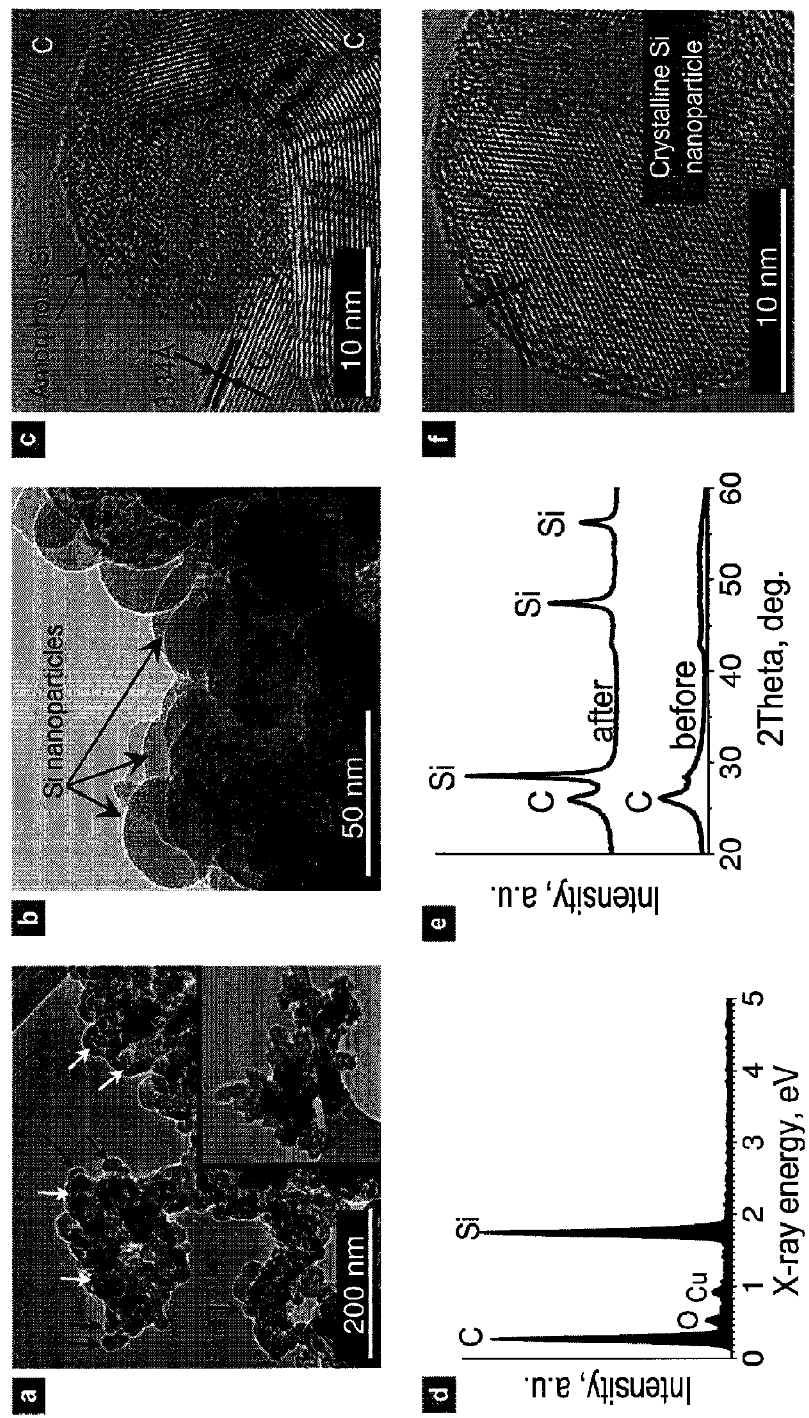
FIGS. 3(*a*) through 3(*c*) include transmission electron microscope (TEM) images obtained at different magnifications for a composite granule in accordance with some embodiments of the present invention, wherein the black arrows in FIG. 3(*a*) point to spherical amorphous Si nanoparticles, while white arrows point to the edges of the graphitized carbon black backbone chain of the dendritic particle, and the size of the inset is 800×800 nm. The TEM image of FIG. 3(*c*) shows the highly-ordered graphitic structure of a carbon black surface with (002) interplanar spacing of about 3.34 Angstroms and the amorphous structure of the Si nanoparticles.

The deposition of Si nanoparticles was conducted via low pressure (about 1 Torr) silane ($SiH_4$) decomposition at about 500° C. for about 1 hour. Transmission electron microscopy (TEM) revealed the nanoparticles to possess a spherical shape of about 10 nm to about 30 nm in diameter, having been deposited on the surface of the annealed CB (FIG. 3(*a*)), as previously shown in FIG. 1(*a*). Most nanoparticles exhibited an amorphous microstructure or were highly disordered, as shown in FIG. 3(*b*). The nanoparticles densely coated the carbon surface, frequently attached to the edges of the graphitic structures. Once a stable nucleus was formed, growth occurred via adsorption of gas species on the nucleus surface. The spherical shape of the particles minimized the contact area between the Si and CB surfaces, likely due to the high interfacial energy between Si and the flat faces of the graphitized CB particles, which possessed a negligible concentration of surface functionalities. The low synthesis temperature may have minimized the surface mobility of Si atoms and contributed to the smooth morphology of the Si surface. No impurities were detected in the sample by energy dispersive X-ray spectroscopy (EDX), as shown in FIG. 3(*d*).

In wet granulation, a liquid binder wets small primary particles as they are agitated, causing them to self-assemble into larger spheres by a combination of viscous and capillary forces. The drying or annealing process transforms the binder into a dense solid which preserves the shape of the granules. For electrode particles, the solid granule should ideally have high electrical conductivity, high mechanical stability, and high permeability to Li ions. Graphitic carbon exhibits a unique combination of these attributes. In order to prevent the oxidation of Si nanoparticles a hydrocarbon was selected as a carbon-precursor binder for granulation. In a conventional wet granulation process, a liquid binder is typically introduced as droplets. It penetrates into the pores of the powder surface, forming initial nuclei, which grow over time. If the droplet size is relatively small, the nucleation will occur by distribution of the drops on the surface of the particles and subsequent particle coalescence. The process is similar to melt agglomeration, where the binder melts and the melt-coated particles stick together to form granules. However, it is commonly difficult to achieve uniform binder deposition required for the controlled and uniform formation of granules. Therefore, in this study, the binder was introduced in gaseous form.

Simultaneous granulation and carbon deposition processes were performed via decomposition of propylene ($C_3H_6$) at about 700° C. for about 30 minutes. This higher temperature step caused significant crystallization in the deposited Si nanoparticles. X-ray diffraction (XRD) analysis of the produced samples showed the average grain size of the Si nanoparticles to be about 30 nm, as shown in FIG. 3(*e*). TEM studies confirmed the crystalline structure of Si nanoparticles after exposure to about 700° C. (FIG. 3(*f*)).

Figure 4:
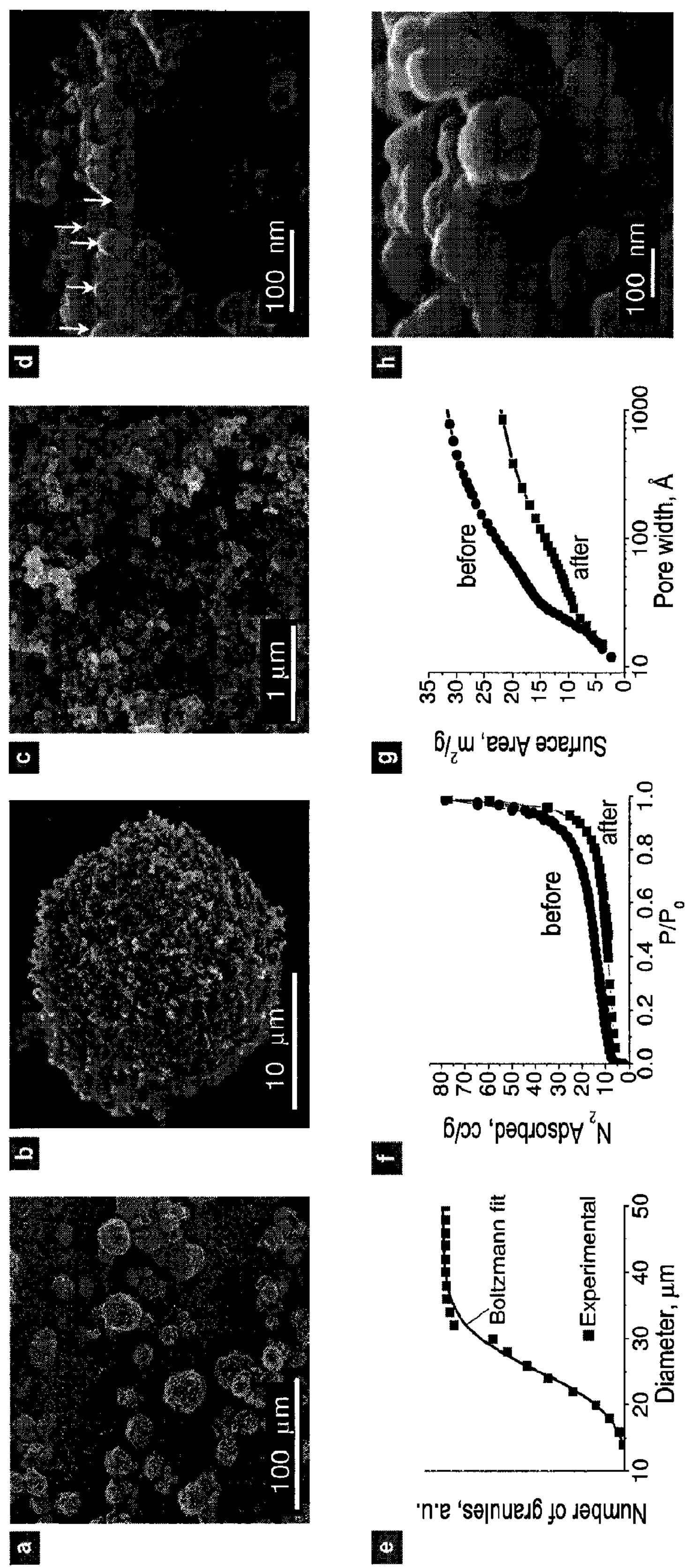
FIGS. 4(*a*) through (*d*) include scanning electron microscope (SEM) images recorded at different magnification of the structure of a Si—C composite granule self-assembled during carbon deposition on the Si-decorated annealed carbon black particles. The white errors in FIG. 4(*d*) point to carbon-coated Si nanoparticles visible on the surface of the granules.
Figure 6:
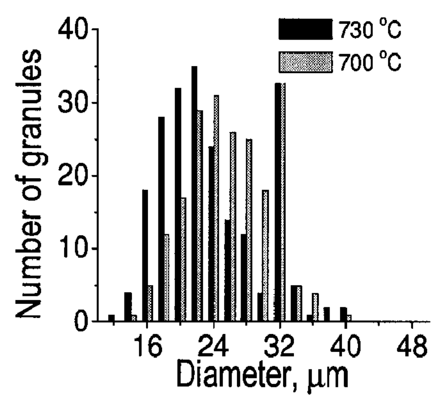
FIG. 6 graphically illustrates the size distribution of various spherical granules synthesized at about 700 and about 730° C.
Figure 7:
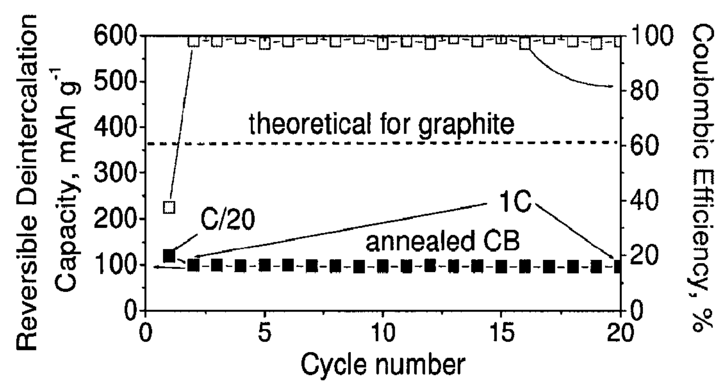
FIG. 7 provides reversible Li deintercalation capacity and Coulombic efficiency of an annealed carbon black electrode vs. cycle number in comparison to the theoretical capacity of graphite.

The SEM micrographs of FIGS. 4(*a*) and (*b*) show the spherical granules formed in the course of C deposition. The particle surface was rough, with surface asperities of about 500 nm to about 1 μm, as seen in FIGS. 4(*b*) and (*c*). In spite of the C coating, small Si nanoparticles were visible on the surface, as evidenced in FIG. 4(*d*). The diameter of the granule spheres ranged from about 15 μm to about 35 μm, and showed a narrow particle size distribution with the average diameter of about 26 μm (FIG. 4(*e*)). The granule size distribution was controlled by the granulation process conditions, as shown in FIG. 6 and could be optimized for the specific application. Propylene decomposition took place via multiple intermediate steps. The hydrocarbon products of intermediate steps of $C_3H_6$ decomposition are known to form larger molecular weight compounds, including toluene, ethylbenzene, styrene, naphthalene, biphenyl and others, which adsorb on the surface of the substrates during the CVD reaction. In the adsorbed state, they acted as a liquid agglomeration binder before their final transformation into carbon. Initially, vibration was introduced to the sample tube in order to agitate the nanoparticles. However, further experiments proved that due to the very low density of the granules, the vibration was unnecessary. All of the granules were synthesized without artificial agitation in a simple horizontal tube furnace.

The bottom-up assembly preserved most of the surface area of the primary particles. Indeed, $N_2$ gas sorption measurements, as shown in FIG. 4(*f*) showed that the decrease of the specific surface area (SSA) after C deposition was rather modest—Brunauer-Emmett-Teller (BET) SSA of the Si—C self-assembled granules was about 24 $m^2/g$, which was close to that of the Si-decorated CB (about 33 $m^2/g$). The pore size distribution of the spherical particles showed the presence of about 30 nm to about 100 nm pores (FIG. 4(*g*)). These pores were also visible on the SEM micrographs shown in FIGS. 4(*c*) and (*d*). Carbon coating of the surface of the pure CB also resulted in the formation of porous granules with larger surface features and no visible particles of about 10 nm to about 30 nm diameter (FIG. 4(*h*)).

Example 2

Fabrication and Characterization of Coin Cells Using Si—C Composite Anode

Figure 5:
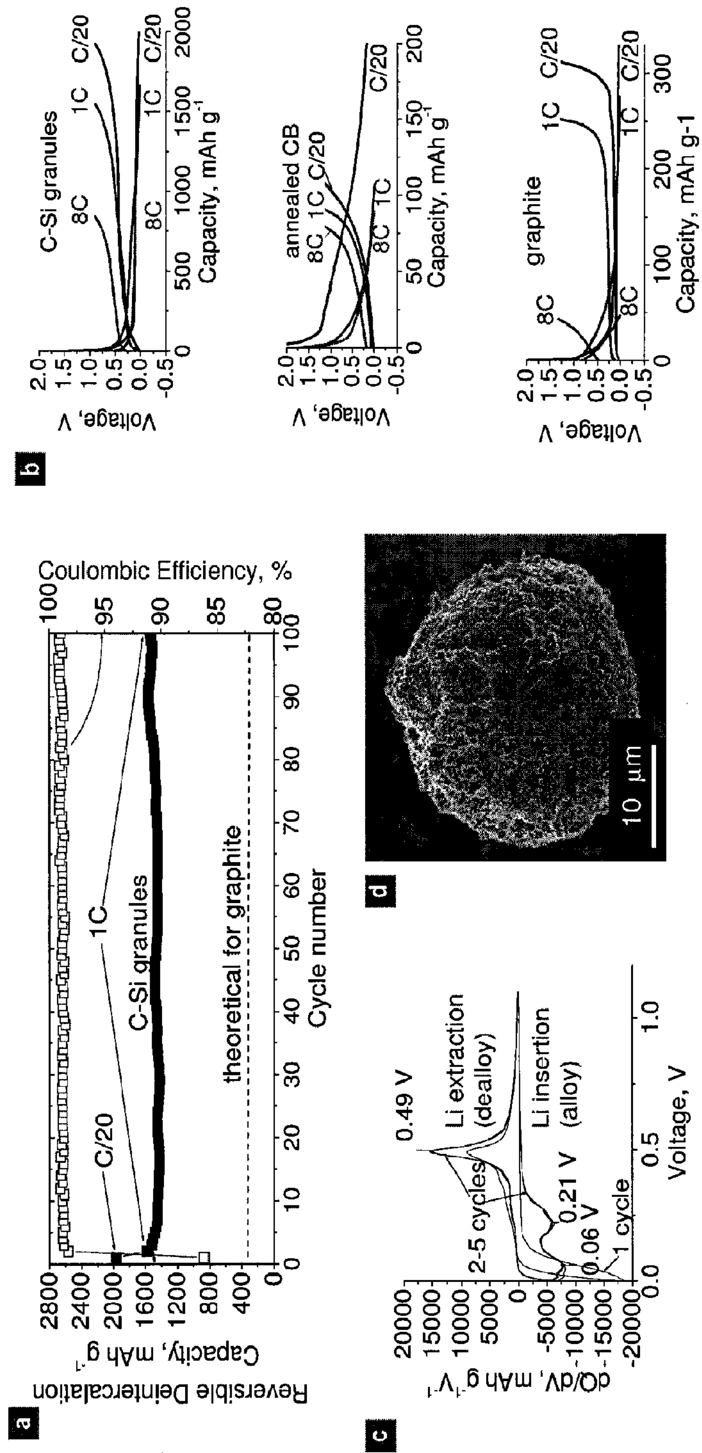
FIG. 5 provides information regarding the electrochemical performance of the Si—C granules as anodes in coin cell batteries taken at room temperature in two-electrode 2016 coin-type half-cells. Specifically, FIG. 5(*a*) illustrates the reversible Li deintercalation capacity and Coulombic efficiency of the granule electrodes vs. cycle number in comparison to the theoretical capacity of graphite.

Coin cells (2016) with metallic Li counter electrodes were employed to evaluate the electrochemical performance of the anodes produced in EXAMPLE 1. The specific reversible deintercalation capacity of the sample with an estimated about 50 wt. % of Si reached about 1950 mAh/g at C/20, as shown in FIG. 5(*a*). This gravimetric capacity was greater than about 5 times higher than that of the theoretical capacity of graphite, about 6 times that of high performance graphitic anodes, and was about 16 times that of the annealed carbon black (FIGS. 5(*a*), 5(*b*) and 7). The specific capacity of the Si nanoparticles alone was estimated to be about 3670 mAh/g at C/20, which is the highest value ever reported for nanoparticles. It approached the theoretical capacity of Si (about 4200 mAh/g if $Li_{22}Si_5$ is achieved). Such high specific capacity value indicates high accessibility of the active Si for Li insertion in the designed composite architecture. The overall carbon contribution was estimated to be about 230 mAh/g (115 mAh/0.5g). The volumetric capacity was determined to be about 1270 mAh/cc at C/20, which was higher than about 620 mAh/g for graphitic anodes. The irreversible capacity losses in the first cycle (FIG. 5(*a*)) are related to the solid-electrolyte interphase formation and, in contrast to carbon black (FIGS. 5(*b*) and 7), are rather modest (about 15%) due to the high electrode capacity (FIG. 4(*g*)).

While Si anodes are known to suffer from sluggish kinetics, the self-assembled electrodes of EXAMPLE 1 demonstrated outstanding high rate capability. The specific capacity of the composite anodes at the fast discharge rates of 1 C and 8 C was 1590 and 870 mAh/g, respectively, which was about 82 and about 45% of that at C/20(FIGS. 5(*a*) and (*b*)). Even graphite, with high Li diffusion coefficients and low overall capacity could not match such capacity retention at 8 C rate (2.98 A/g) and showed deintercalation capacity of about 40 mAh/g, which was 13% of the C/20 specific capacity (FIG. 5(*b*)). For the same specific current value (2.98 A/g), the composite Si—C electrodes of EXAMPLE 1 showed capacity in excess of 1500 mAh/g, which was over 37 times higher. Clearly, in spite of the large particle size (FIGS. 4(*a*) and (*b*)), Li ions were able to rapidly reach the active anode material within each granule.

The differential capacity curves of FIG. 5(*c*) show broad lithiation (Li insertion) peaks at 0.21 and 0.06 V, and a narrower delithiation (Li extraction) peak at 0.5 V. The C delithiation peaks commonly observed at 0.2V were too small to be visible, due to the very small contribution of carbon to the overall anode capacity. A delithiation peak at 0.3 V often reported in both micron-scale Si-powder and Si-nanowire cells was not present. An increase in the 0.5 V peak height after the first cycle indicates improvement in Li extraction kinetics. The formation of an amorphous Si—Li alloy upon the insertion of Li into crystalline Si in the first cycle began at 0.1 V, in agreement with previous studies on nanowires. Subsequent cycles showed an additional lithiation peak at 0.21 V, which corresponds to higher voltage lithiation of amorphous Si—Li phase.

The pores available in the composite granules for Si expansion during Li insertion (FIGS. 4(*c*), (*d*), (*f*), and (*g*)) also allowed for efficient and stable anode performance (FIG. 5(*a*)). The SEM studies of the anode particles after high speed mixing, calendaring, and cycling demonstrated exceptional robustness of the granules (FIG. 5(*d*)). The tap density of the Si—C powder was estimated to be about 0.49 g/cc, which is lower than that of the graphite (about 1.3 g/cc), but higher than that of annealed carbon black (about 0.22 g/cc). The Si nanopowder (10-30 nm) alone was expected to have an even lower tap density.

The observed high capacity (FIG. 5(*a*)), combined with excellent sample stability and high rate capability was unprecedented in Si—C composite powders. In contrast to many photonic, electronic, or membrane applications, where a high degree of order is typically required, the granules assembled according to EXAMPLE 1 may benefit from a disorder in their structure. If the path of Li-ions is blocked or impeded in one narrow channel by an expanded Si—Li alloy particle or by an area of unevenly formed solid-electrolyte interphase (SEI), the interconnected aperiodic porous network allowed for the redirection of the ion traffic, maintaining rapid charging capability for these granules. Therefore, the disorder in the granules may enhance the functionality of the composite anode, as it does in some photonic crystals and catalytic structures.

Thus, these two examples demonstrated applications of a hierarchical bottom-up assembly method for the rational design of nanocomposite powders that offer exceptional properties for use in energy storage applications. While nanoparticles or nano-whiskers are known to possess inhalation and often explosion risks, poor flow and handling, and challenges in metering and control, the Si—C nanocomposite granules of these examples provide improved handling, reduced dustiness which minimizes losses, increased bulk density, and other positive attributes.

The embodiments of the present invention are not limited to the particular formulations, process steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of this disclosure have been described in detail with particular reference to exemplary embodiments, those skilled in the art will understand that variations and modifications can be effected within the scope of the disclosure as defined in the appended claims. Accordingly, the scope of the various embodiments of the present invention should not be limited to the above-discussed embodiments, and should only be defined by the following claims and all equivalents.

What is claimed is:

1. A porous composite comprising:

a plurality of agglomerated nanocomposites, wherein each of the plurality of nanocomposites comprises:

a dendritic particle comprising a three-dimensional, randomly-ordered assembly of nanoparticles of an electrically conducting material, and a plurality of discrete non-porous nanoparticles of a non-carbon Group 4A element or mixture thereof disposed on a surface of the dendritic particle;

wherein each nanocomposite of the plurality of agglomerated nanocomposites has at least a portion of the dendritic particle in electrical communication with at least a portion of a dendritic particle of an adjacent nanocomposite in the plurality of agglomerated nanocomposites, and wherein the porous composite comprises a total pore volume within the porous composite that has a range of 3 to 20 times the volume occupied by all of the non-carbon Group 4A element nanoparticles in the porous composite.

2. The porous composite of claim 1, wherein the electrically conducting material of the dendritic particle is amorphous or graphitic carbon.

3. The porous composite of claim 2, wherein the amorphous carbon is carbon black.

4. The porous composite of claim 1, wherein the non-carbon Group 4A element or mixture thereof comprises silicon.

5. The porous composite of claim 1, wherein the porous composite further comprises an electrically conducting coating disposed on at least a portion of a surface of a dendritic particle of at least one of the plurality of agglomerated nanocomposites.

6. The porous composite of claim 5, wherein the electrically conducting coating is formed from carbon.

7. The porous composite of claim 1, wherein the plurality of agglomerated nanocomposites are agglomerated together using an electrically conducting additive.

8. The porous composite of claim 7, wherein the electrically conducting additive is carbon.

9. The porous composite of claim 1, wherein the plurality of discrete non-porous nanoparticles has an average longest dimension of about 5 nanometers to about 200nanometers.

10. The porous composite of claim 1, wherein the plurality of discrete non-porous nanoparticles comprise about 15 weight percent to about 90 weight percent of each nanocomposite.

11. The porous composite of claim 1, wherein the porous composite is a spherical or substantially-spherical granule.

12. The porous composite of claim 1, wherein at least a portion of the discrete non-porous nanoparticles on the surface of the dendritic particle contact each other.

13. A battery electrode comprising:

a conductive metal substrate; and a porous composite dispersed in a binder coupled to the conductive metal substrate, wherein the porous composite comprises a plurality of agglomerated nanocomposites, wherein at least one nanocomposite of the plurality of agglomerated nanocomposites comprises:

a dendritic particle comprising a three-dimensional, randomly-ordered assembly of nanoparticles of an electrically conducting material, and a plurality of discrete non-porous nanoparticles of a non-carbon Group 4A element disposed on a surface of the dendritic particle;

wherein the at least one nanocomposite of the plurality of agglomerated nanocomposites has at least a portion of the dendritic particle in electrical communication with at least a portion of a dendritic particle of an adjacent nanocomposite in the plurality of agglomerated nanocomposites, and wherein the electrode comprises a total pore volume within the electrode that has a range of 3 to 20 times the volume occupied by all of the non-carbon Group 4A element nanoparticles in the porous composite.

14. A battery, comprising:

a cathode comprising lithium;

an anode comprising a porous composite dispersed in a binder coupled to a conductive metal substrate, wherein the porous composite comprises a plurality of agglomerated nanocomposites, wherein at least one of the plurality of nanocomposites comprises:

a dendritic particle comprising a three-dimensional, randomly-ordered assembly of nanoparticles of an electrically conducting material, and a plurality of discrete non-porous nanoparticles of a non-carbon Group 4A element or mixture thereof disposed on a surface of the dendritic particle, wherein at least one nanocomposite of the plurality of agglomerated nanocomposites has at least a portion of the dendritic particle in electrical communication with at least a portion of a dendritic particle of an adjacent nanocomposite in the plurality of agglomerated nanocomposites, and wherein the anode comprises a total pore volume within the anode that has a range of 3 to 20 times the volume occupied by all of the non-carbon Group 4A element nanoparticles in the porous composite;

a separator, positioned between the cathode and the anode; and an electrolyte composition disposed between the cathode and the anode.

15. A method of making a porous composite, the method comprising:

forming a plurality of agglomerated nanocomposites, wherein each of the plurality of nanocomposites is formed by:

obtaining a three-dimensional, randomly-ordered dendritic particle composed of a plurality of discrete nanoparticles of an electrically conducting material, and disposing a plurality of discrete non-porous nanoparticles of a non-carbon Group 4A element or mixture thereof on a surface of the dendritic particle to form a nanocomposite particle;

wherein the porous composite is formed with a total pore volume within the porous composite that has a range of 3 to 20 times the volume occupied by all of the non-carbon Group 4A element nanoparticles in the porous composite.

16. The method of claim 15, wherein the three-dimensional, randomly-ordered dendritic particle is obtained by annealing carbon black nanoparticles at a temperature of above about 2000 ° C.

17. The method of claim 15, wherein the three-dimensional, randomly-ordered dendritic particle is obtained by pyrolysis of a hydrocarbon gas at a temperature of between about 700 ° C. to about 1400 ° C.

18. The method of claim 15, wherein the plurality of discrete non-porous nanoparticles of a non-carbon Group 4A element or mixture thereof are disposed on the surface of the dendritic particle using a chemical vapor deposition process.

19. A method of making an electrode, the method comprising:

obtaining a porous composite, the porous composite comprising a plurality of agglomerated nanocomposites, wherein each of the plurality of nanocomposites comprises:

a dendritic particle comprising a three-dimensional, randomly-ordered assembly of nanoparticles of an electrically conducting material, and a plurality of discrete non-porous nanoparticles of a non-carbon Group 4A element or mixture thereof disposed on a surface of the dendritic particle, wherein each nanocomposite of the plurality of agglomerated nanocomposites has at least a portion of the dendritic particle in electrical communication with at least a portion of a dendritic particle of an adjacent nanocomposite in the plurality of agglomerated nanocomposites, and wherein the electrode is formed with a total pore volume within the electrode that has a range of 3 to 20 times the volume occupied by all of the non-carbon Group 4A element nanoparticles in the porous composite;

forming a mixture of the porous composite with a binder; and applying the mixture to a conductive metal substrate.

* * * * *